(12) United States Patent
Luo et al.

(10) Patent No.: US 7,263,722 B1
(45) Date of Patent: Aug. 28, 2007

(54) OBFUSCATION OF EXECUTABLE CODE

(75) Inventors: Chenghui Luo, Johnston, RI (US); Jian Zhao, Rumford, RI (US)

(73) Assignee: Fraunhofer CRCG, Inc. (DE)

( * ) Notice: Subject to any disclaimer, the term of this patent is extended or adjusted under 35 U.S.C. 154(b) by 0 days.

(21) Appl. No.: 10/019,828

(22) PCT Filed: May 12, 2000

(86) PCT No.: PCT/US00/13128

§ 371 (c)(1),
(2), (4) Date: May 21, 2002

(87) PCT Pub. No.: WO00/72112

PCT Pub. Date: Nov. 30, 2000

Related U.S. Application Data

(60) Provisional application No. 60/133,840, filed on May 12, 1999, provisional application No. 60/133,848, filed on May 12, 1999.

(51) Int. Cl.
*G06F 12/14* (2006.01)

(52) U.S. Cl. .................... 726/26; 713/164; 713/167; 713/189; 713/193; 713/194; 717/108; 717/118; 717/137; 717/147

(58) Field of Classification Search .............. None
See application file for complete search history.

(56) References Cited

U.S. PATENT DOCUMENTS 5,745,569 A * 4/1998 Moskowitz et al. .......... 705/58
6,102,966 A * 8/2000 Tyma .......................... 717/110
6,668,325 B1 * 12/2003 Collberg et al. ............. 713/194
6,779,114 B1 * 8/2004 Chow et al. ................. 713/189
6,792,596 B2 * 9/2004 Maruyama et al. .......... 717/110
2001/0025370 A1 * 9/2001 Maruyama et al. ............ 717/2

OTHER PUBLICATIONS

Miecznikowski, J., et al, 'Decompiling Java Bytecode: Problems, Traps and Pitfalls', 2002, Sable Research Group, School of Computer Science, McGill University, entire document, www.sable.mcgill.ca/publications/papers/2002-2/sable-paper-2002-2.ps.gz.*

* cited by examiner

*Primary Examiner*—Nasser Moazzami
*Assistant Examiner*—Ronald Baum
(74) *Attorney, Agent, or Firm*—Gordon E. Nelson

(57) ABSTRACT

Three new obfuscation techniques. Data field obfuscation replaces references to data fields that use an object name and a field name with references that use an object name but do not use a field name. Obfuscation using the reflection mechanism for the executable code works by replacing a construct in the executable code with one or more equivalent constructs made using the reflection mechanism. Obfuscation of externally-defined constructs is done by relating the externally-defined construct to an obfuscation for the construct that is used within the executable code. The relationship is defined in a portion of the executable code, and at least the externally-fined construct is encrypted in the portion. The various obfuscation techniques may be used with each other or with other previously-known obfuscation techniques. The disclosed obfuscation techniques are particularly well-adapted for use with the byte codes produced by Java language compilers from Java language programs.

13 Claims, 7 Drawing Sheets

```
import java.util.Date;          ___ 303
import java.util.Vector;___/ public class Person {           ___ 304
    private Vector v = new Vector();___/
    public Person(String n, Date d) // constructor
    {
        v.addElement(n);    ⎫
        v.addElement(d);    ⎬ 305
    }                       ⎭
    public void changeName(String newName)
    {
        String s = (String)v.elementAt(0);   ___ 307
        s = newName;
        v.setElementAt(s, 0);   ___ 309
    }
}

301 import java.util.Date;
import java.util.Vector;
public class P {___ 311
    private Vector v = new Vector();
    public P(String n, Date d) // constructor
    {
        v.addElement(n);
        v.addElement(d);
    }
    public void c(String n)   ___ 313
    {
        String s = (String)v.elementAt(0);
        s = n;   ___ 315
        v.setElementAt(s, 0);
    }
}

310
```

```
                    202
                      \
import java.util.Date;
                  203   205
public class Person {
  private String name;
                        207
  private Date dob; //date of birth
  public Person(String n, Date d) //constructor
  {
        name = n;
        dob = d;      209        211
  }
  public void changeName(String newName)
  {
        name = newName;
  }
}
```

```
import java.util.Date;              ⟋— 303
import java.util.Vector;⟋ public class Person {               ⟋— 304
  private Vector v = new Vector();
  public Person(String n, Date d) // constructor
  {
       v.addElement(n);      ⎤
       v.addElement(d);      ⎬— 305
  }                          ⎦
  public void changeName(String newName)
  {
       String s = (String)v.elementAt(0);    ⟋— 307
       s = newName;
       v.setElementAt(s, 0);    ⟋— 309
  }
}
```

301

```
import java.util.Date;
import java.util.Vector;
             ⟋— 311
public class P {⟋
  private Vector v = new Vector();
  public P(String n, Date d) // constructor
  {
       v.addElement(n);
       v.addElement(d);
  }                       ⟋— 313
  public void c(String n)
  {
       String s = (String)v.elementAt(0);
       s = n;    ⟋315
       v.setElementAt(s, 0);
  }
}
```

```
public class P {  /-403
    private V v = new
    public P(S n, D d)  // constructor
    {
        v.a(n);  405   407
        v.a(d);
    }         411
    public void c(S n)
    {                    /-413
        S s = (S)v.b(0);
        s = n;
        v.c(s, 0);
    }
}         415
```

401

```
java.lang.String    S
java.util.Date      D
java.util.Vector    V
```

```
Person p = new Person("John Doe", new Date());
p.changeName("John Hancock");
```

501

```
Class c = p.getClass();        ╱─ 505
Method[] m = c.getMethods();   ╱─ 507
Sting[] a ={"John Hancock"};   ╱─ 509
m[1].invoke(p, a); // same as p.changeName("John
Hancock")
              ╲─ 511
```

OBFUSCATION OF EXECUTABLE CODE

CROSS REFERENCES TO RELATED APPLICATIONS

The present patent application claims priority from U.S. Provisional Applications 60/133,848, J. Zhao, Watermarking Java software for copyright protection and 60/133,840, J. Zhao, Watermarking mobile code to detect and deter malicious hosts, both filed 12 May, 1999.

BACKGROUND OF THE INVENTION

1. Field of the Invention

The invention relates generally to protecting executable code against impermissible uses and more particularly to altering executable code to reduce the amount that can be learned from the executable code by decompiling or disassembling it.

2. Description of Related Art

As more and more of the devices attached to networks have become programmable, mobile code has become more and more important. Mobile code is code which is downloaded to a device attached to a network in the course of an interaction between a user of the device and the network (or another device attached to the network) and is then executed as part of the interaction. Mobile code is ubiquitous in the Internet. Many Web pages include mobile code written in the Java™ or ActiveX programming languages. When the Web page is received in a browser, the mobile code is executed by the computer upon which the browser is written. Mobile code is also used to implement features in devices such as cellular telephones. When a user does something with the cellular telephone which requires the feature, mobile code for the feature is downloaded to the cellular telephone and then used in the interactions that involve the feature.

From the point of view of the owner of the intellectual property rights in a piece of mobile code, the very mobility of the code is a problem. In order to be useful, the code must be downloaded to the user; once it has been downloaded, it is available to the skilled user for study and reverse engineering. Using tools such as decompilers (programs which produce a high-level language version of a program, for example, a source code version, from an object code version), disassemblers (programs which produce an assembly-language program from an object code version), or debuggers (programs which permit a user to observe and manipulate another program as the other program executes), the skilled user can learn a great deal about the mobile code and can use what he or she learns to produce his or her own version of it.

A technique that has been widely used to make the study of programs generally and mobile programs in particular more difficult is obfuscation. To obfuscate a program, one rewrites it in a form which does not substantially affect the manner in which the program executes, but does make the program more difficult to study. For example, most of the entities in a program have names chosen by the programmer. Programmers generally choose the names with an eye to making the program more understandable for human readers of it. For the systems which are used to generate executable code from the program or to execute the code, though, it makes no difference whether a name is understandable. These systems require only that the name be used according to the rules of the relevant programming language. Thus, one way of obfuscating a program is to replace all of the names in the program with names that are legal in the programming language but as meaningless as possible to a human being reading the program. For a general discussion of obfuscation, see the published PCT application, WO 99/01815, Collberg, et al., Obfuscation techniques for enhancing software security, published 14 Jan. 1999.

Many mobile programs are written in the Java programming language, developed by Sun Microsystems, Inc. and described in detail in Ken Arnold, et al., *The Java Programming Language*, Addison-Wesley Publishing Company, Reading, Mass., 1997. Programs written in the Java programming language are intended to be used in an infrastructure 101 of the type shown in FIG. 1. Writing a Java language program involves the portions of the infrastructure shown at 103 through 107. Java source code 103 is the Java language code as written by the programmer; Java compiler 105 is a program which generates Java byte code 107 from Java source code 103. Java byte code 107 is executable on any programmable device which includes a Java virtual machine. For a general discussion of the Java virtual machine, see Tim Lindholm and Frank Yellin, *The Java Virtual Machine Specification*, Addison-Wesley Publishing Company, Reading, Mass., 1999

Such a programmable device is shown at 111. Device 111 has two main hardware components, processor 113, which executes machine instructions 117, and memory 114, in which programs and data are stored. Included in the programs is Java virtual machine 115, which interprets the byte codes in Java byte code 107 to produce machine instructions 117. Programmable device 111 is connected to network 109 and Java byte code 107 is a mobile program which has been downloaded via network 109 from a server (not shown) upon which it was stored. As indicated above, byte code 107 may be a part of an HTML page being interpreted by a Web browser.

In interpreting Java byte code 107, Java virtual machine 115 must interpret Java byte code 107's names. Some of the names in byte code 107 are defined by the Java infrastructure; others are defined in byte code 107. In the Java programming language, names are defined in class definitions; Java virtual machine 115 has access to two sets of class definitions: Java system classes 119, which are class definitions that are available to the Java virtual machine from sources other than byte code 107, and application classes 121, which are classes defined in byte code 107. Application classes 121, like the other data used in the execution of Java byte code 107, is stored in application runtime 123, an area private to the execution of Java byte code 107. The use of application runtime 123 ensures that an execution of byte code 107 will neither affect nor be affected by the execution of other Java byte codes. Moreover, application runtime 123 can be defined in a manner which limits the amount of control that a byte code 107 may exercise over programmable device 111, and can thereby protect programmable device 111 from mistakes in byte code 107 or malicious byte codes.

The popularity of the Java programming language for mobile code is a result of the advantages offered by Java infrastructure 101. Because Java byte codes can be executed on any device with a Java virtual machine, Java byte codes are completely portable. Because application runtime 123 offers a protected execution environment for the byte codes, the byte codes may be safely executed on any of these devices. Infrastructure 101 does, however, have a significant disadvantage: Java byte codes are more difficult to protect against study and reverse engineering than other executable programs.

One reason for this is that a Java byte code and a Java virtual machine together contain far more information about the program than is available in the object code generally produced by compilers. Together, Java system classes 119 in the Java virtual machine and application classes 121 for a given Java byte code contain all of the information needed to define the symbolic names used in the Java byte code. Symbolic names include class, method, and field names. Some of the symbolic names are defined by the programmer for the particular application program and others are defined as part of the Java infrastructure. Because the name definitions are included in the byte code and the Java virtual machine, a programmer who is studying the byte code can use the Java reflection mechanism or a Java debugger to find out the complete class information for a particular program construct in the byte code.

Another reason why Java byte code is difficult to protect is that when Java virtual machine 115 executes a Java byte code, it links the names in the byte code that are defined in the Java system classes to the definitions 119 of those classes in programmable device 111. The linking is done by matching the names in the byte code with names in the definitions 119. Consequently, the names defined in the Java system classes cannot be obfuscated in the byte code. If they are obfuscated, virtual machine 115 cannot find the definitions in system classes 119 and if it cannot do that, it cannot execute the byte code.

It is an object of the present invention to overcome the above disadvantage of the Java infrastructure by providing improved techniques for obfuscating Java byte codes, including names in those byte codes that are defined in Java system classes.

SUMMARY OF THE INVENTION

The obfuscation techniques provided by the present invention include data field obfuscation, obfuscation using a programming language's reflection mechanisms, and obfuscation of externally-defined constructs such as system-defined names or names defined in dynamically-linked libraries.

Data field obfuscation replaces references to data fields that use an object name and a field name with references that use an object name but do not use a field name. One example of such obfuscation is the definition of an array object that has an element containing the data referred to by the field name and replacing references using the object name and field name with array element references.

Obfuscation using the reflection mechanism for the executable code works by replacing a construct in the executable code with one or more equivalent constructs made using the reflection mechanism. For example, an invocation of a method that is made using the object's name and the name of a method defined for the object's class can be replaced by an invocation which is carried out by using the reflection mechanism to obtain information about the class's methods and to invoke the method without use of either the class or the method's name.

Obfuscation of externally-defined constructs is done by relating the externally-defined construct to an obfuscation for the construct that is used within the executable code. The relationship is defined in a portion of the executable code, and at least the externally-defined construct is encrypted in the portion. When the executable code is executed, a key and cryptographic apparatus are used to relate the externally-defined construct to its external definition. This can be done by using a decryption key to decrypt the externally-defined construct and then relating the decrypted construct to the external definition or by using an encryption. It can also be done by using an encryption key to encrypt the externally-defined construct from the external definition and using that second encrypted construct to the first encrypted construct in the program and thereby relate the external definition to the obfuscation.

The various obfuscation techniques may be used with each other or with other previously-known obfuscation techniques. The obfuscation techniques of the invention are particularly well-adapted for use with the byte codes produced by Java language compilers from Java language programs.

Other objects and advantages will be apparent to those skilled in the arts to which the invention pertains upon perusal of the following Detailed Description and drawing, wherein:

BRIEF DESCRIPTION OF THE DRAWING

FIG. 2 is an example of a class definition in the Java programming language;

FIG. 3 shows first two stages in the obfuscation of the example of FIG. 2;

FIG. 4 shows a third stage in the obfuscation of the example of FIG. 2;

FIG. 5 shows obfuscation of method names; and

Figure 1:
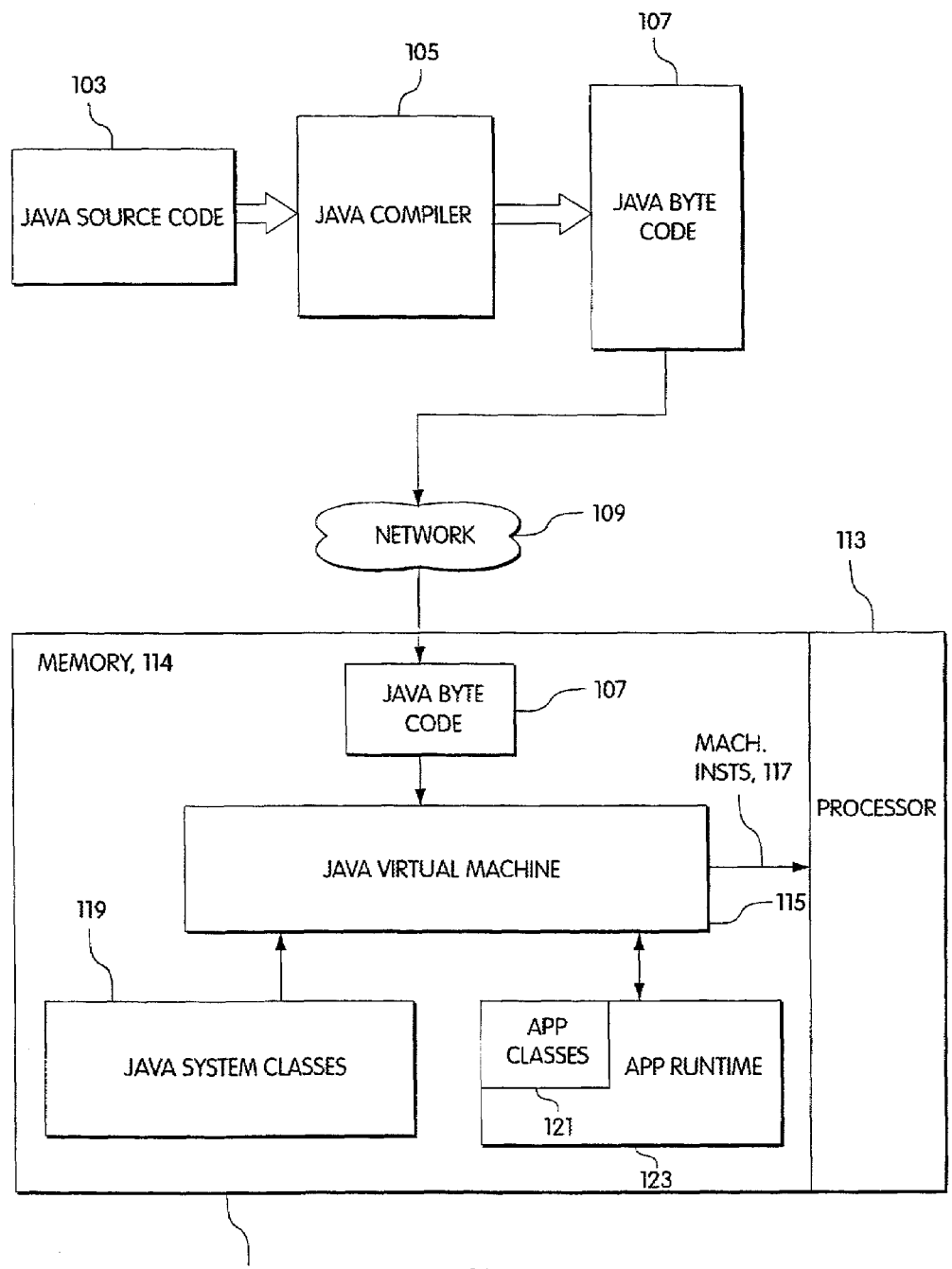
FIG. 1 is a block diagram of a prior-art infrastructure for programs written in the Java programming language.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present two new techniques for code obfuscation generally and will then present techniques which employ encryption for obfuscation and thereby overcome the problems which Java system-defined symbolic names or other "well-known" names pose for obfuscation.

Data Field Obfuscation: FIGS. 2-4

FIG. 2 shows a class definition 201 in the Java language as it might be written in Java source code. The following discussion shows how all of the symbolic names in the class definition may be obfuscated by replacing them with less-informative names. Though the techniques in the example are being applied to the class definition in the source code, they may be equally applied to the class definition in the Java byte code.

Class definition 201 defines a class Person of objects. Objects of the class contain two items of personal data, namely a person's name (name) and his or her date of birth (dob), and two methods are defined for objects of the class: namely, a constructor that constructs an object of the class given a name and a date of birth and a changeName method that changes the name information in the object. The programmer who wrote definition 201 has used meaningful names throughout, and consequently, class definition 201 is easy to understand. It should further be pointed out here that import java.util.Date 202 makes a Java system class available for use in class definition 201.

The first stage of the obfuscation is shown in FIG. 3. The first stage 301 uses a new obfuscation technique termed herein data field obfuscation, because it obfuscates the names and types of the fields 205 and 207 that contain the data for an object of the class. The technique works by replacing the data fields with elements of a Java system array class, Vector. The import statement for the class is at 303. For purposes of obfuscation, Vector has the important property that the elements of a Vector object may have different classes, so that Vector hides not only name information, but also class information. At 304, the class definition for Person now specifies that a new object of class Vector be created; its elements will be objects that contain the values of the data fields. The constructor now uses the addElement method of Vector at 305 to add elements to the vector object that contain the object's data fields and to set them to the person's name and date of birth. changeName now takes the first element of the Vector object v (307) as an argument (obtained using the elementAT method of Vector), and the name is given a new value using the setElementAt method of Vector (309). One can now no longer tell from looking at the class declaration for Person that the data stored in objects of the class is the name and date of birth of a person.

Obfuscation continues at 310 using techniques of the type explained in the Collberg reference. At 311, the class name Person is obfuscated by replacing it with the much-less informative P; that of course also obfuscates the name of the constructor. Similarly, changeName is replaced with c at 313 and newName with n at 315. Of course, the replacement names are arbitrary and could be made even more meaningless; for example, they could be simply randomly-generated strings of the characters that are legal in names in the Java language.

FIG. 4, finally, shows how the Java system symbolic names String, Date, and Vector and the symbolic names of the addElement, elementAt, and setelementAt methods can be obfuscated. At 401 is shown the class definition of FIGS. 2 and 3 with this final degree of obfuscation: vector has been replaced by v (403), Date has been replaced by D (407), and String by S (405). The three method names addElement, elementAt, and setElementAt have been replaced by a 411, b 413, and c 415. This is possible because the Java language permits renaming of previously-defined entities, including system-defined symbolic names. One way of doing the renaming in the Java language is shown at 409.

The only difficulty with the foregoing complete obfuscation of the symbolic names defined in the Java system classes is that the renaming of the system class names shown at 409 is included in the Java byte code produced by compiler 105 and is thus available to the user who wants to study the Java byte code. A technique that uses encryption to deal with this problem will be described later.

Method Name Obfuscation: FIG. 5

For a skilled reader of code, relationships between names in the code can be determined from the ways the names are used. An example of this is shown at 501 in FIG. 5. The first line of Java language code shown there creates a new object p of class Person; the next line applies the changeName method of the class to the new object p. Even if the names of the class and the method are obfuscated using the techniques described in the foregoing, it will still be apparent to the skilled reader that the first line of the code creates a new object of the class specified in the first line and that the second line applies a method of the class to the new object.

Such relationships can be obfuscated by using the Java language's reflection mechanism. Because the class information for a Java byte code is available to the Java virtual machine, the Java system classes include methods for returning class information about Java objects. One such method is shown at 505; in the Java language, classes are themselves Java objects, and every Java object is associated with one or more class objects that contain the information about the Java object's class. It thus possible to do what is done at 505: the getClass method of the Java system class Class is applied to the object p and the resulting class information is stored in the Class object c. The class information of course includes the class's methods, and thus it is also possible to do what is done at line 507: the getMethods method of Class is applied to the object c and a list of the methods of the class currently represented by c is assigned to an object m of the array class Method. Finally, the methods themselves are objects that belong to a class, and one of the methods for that class is invoke, which, when applied to an object of the method class, causes the method to be invoked, as shown at 511.

Since one can use the methods of the reflection mechanism to determine an object's class, locate a method of the class, and invoke the method, one can use the methods of the reflection mechanism to perform the operation shown at 501 and thereby add an additional level of obfuscation to the code of 501. The Java code of 503 assumes that an object p exists; in line 505, getClass is used to get p's class information; in line 507, getMethods is used to get the methods that apply to p from the class information; at line 509, a new value for the name is assigned to a string object a, and at 511, the invoke method is used to invoke the method used with the object p to change the value of the name in the object. Thus, as set forth in the comment (which of course would not be in the byte code), m[1].invoke(p,a); is exactly equivalent to p.changeName ("John Hancock"); but much more difficult for the reader to analyze.

It should be pointed out here that obfuscation generally is carried out by a computer program that is applied to the byte code produced by a Java compiler. Conceptually, what such an obfuscation program does is first make a table which contains the names in the byte code that are to be replaced by new names and the names that are to replace the original names and then rewrite the byte code using the replacement names. The obfuscation may be done more than once; for example, the obfuscation program might first do the obfuscation shown in FIGS. 2-4 and then apply the techniques of FIG. 5 to the results of that obfuscation. Obfuscation can even be used to decrease the size of Java byte codes. This is done by using techniques such as Huffman encoding to minimize the size of the names used to obfuscate the original names. Finally, while the obfuscation techniques described above are particularly useful when applied to Java byte codes, they may be applied to any computer program that includes symbolic information such as names. Moreover, while the protection afforded by obfuscation is particularly valuable for mobile code, it may be applied to any kind of code. The obfuscation may be applied to a whole software package after it is developed, or it can be integrated into a compiler to incrementally obfuscate symbolic names as compilations are performed during program development.

Figure 6:
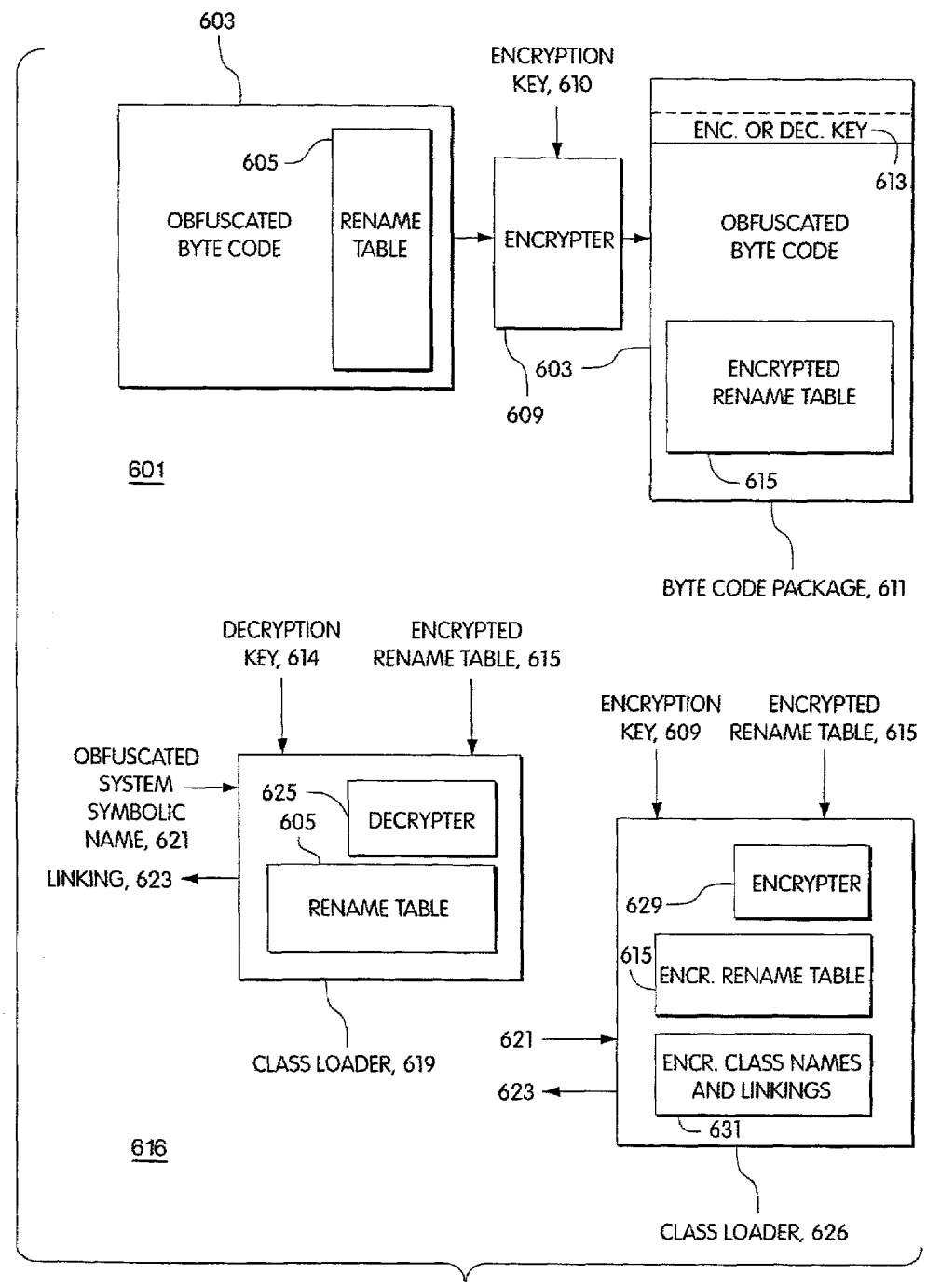
FIG. 6 shows techniques for using encryption to obfuscate system names.
Figure 7:
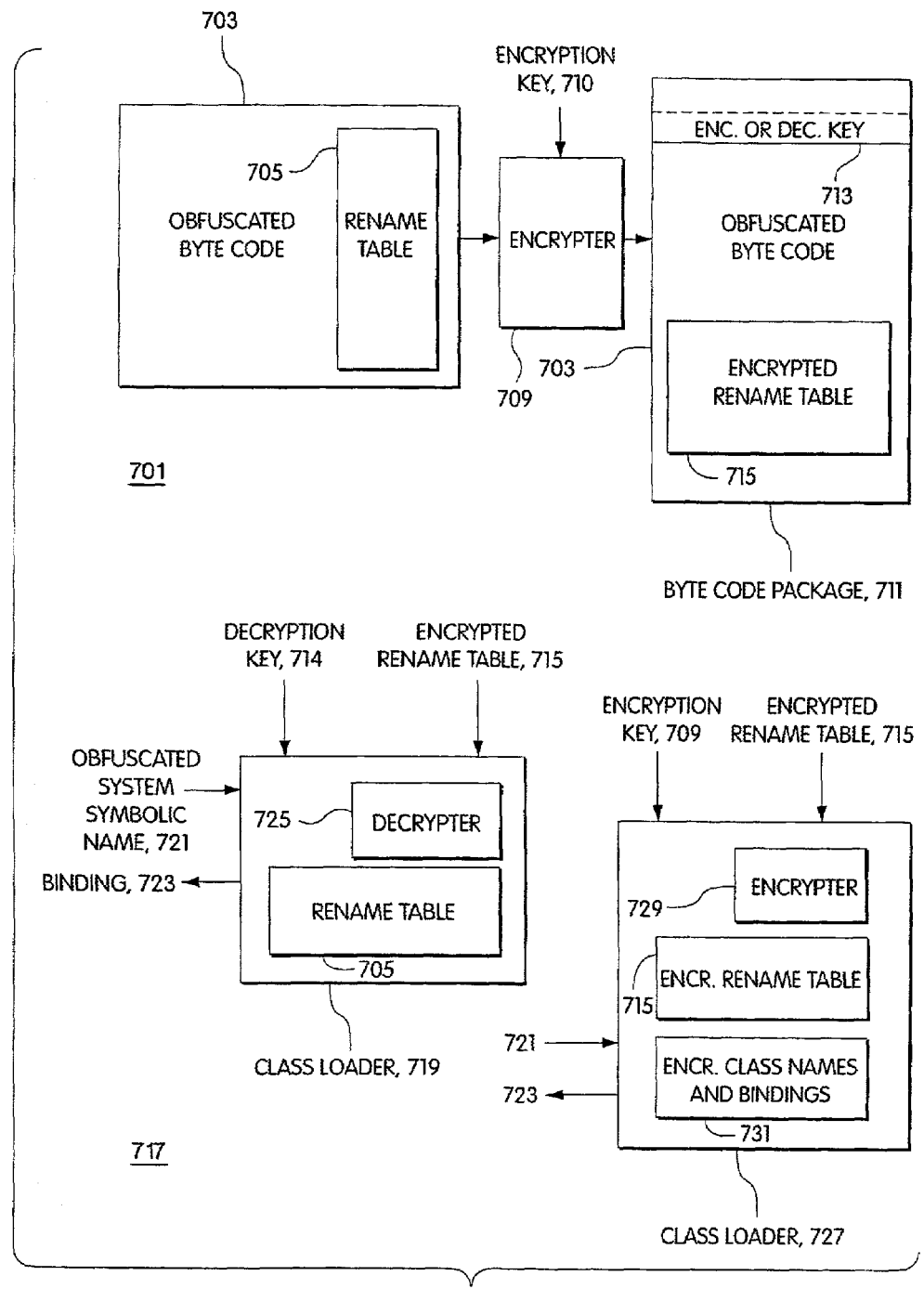

Using Encryption to Obfuscate Java System Class Information: FIG. 6

The Java virtual machine interprets symbolic names as it encounters them in the byte code it is interpreting. If the class information that defines a symbolic name is not already available to the Java virtual machine, a component of the virtual machine called the class loader loads the class information. Class loaders are objects of the system class ClassLoader and have a method loadClass which specifies how class information is loaded and interpreted. Java virtual machines include a default class loader, but Java language programmers may define their own class loaders.

Encryption techniques may be used in Java byte code and Java class loaders to obfuscate symbolic names in the byte code that are defined in Java system classes. The techniques are shown in FIG. 6. At 601 is shown how the information 409 required to relate obfuscated system symbolic names to the original system symbolic names may be encrypted. Obfuscated byte code 603 includes a rename table 604 which relates the obfuscated system symbolic names to the original system symbolic names. Obfuscated byte code 603 is then run through an encrypter 609 which uses any of a number of standard encryption methods to encrypt at least the original system symbolic names in rename table 605. The encryption is done using encryption key 610. The result of the encryption is byte code package 611, which includes obfuscated byte code 603, the encrypted version 615 of rename table 604, and a key 613. As will be explained in detail later, key 613 may be either encryption key 609 or a decryption key that will decrypt encrypted rename table 615.

At 617 and 625 are shown two versions of a class loader that can use encrypted rename table 615 to link the obfuscated system symbolic names to the Java virtual machine's definitions for the names. Beginning with class loader 619 of version 617, class loader 619 is able to receive an obfuscated system symbolic name 621 and return the linking 623 which relates obfuscated system symbolic name 621 to the definition for the original system symbolic name. In order to do this, when system class loader 619 initializes itself for the execution of obfuscated byte code 603, it retrieves encrypted rename table 615 and key 613 from byte code package 611. In this case, key 613 is a decryption key 614. System class loader 619 then uses decrypter 625 to decrypt encrypted rename table 615, and thereby to obtain original rename table 605. System class loader 619 then uses original rename table 605 to relate obfuscated system symbolic name 621 to the original symbolic name and thereby to retrieve linking information 623 for obfuscated system symbolic name 621.

Class loader 627 of version 625 is functionally equivalent to class loader 619, but the way it deals with encrypted rename table 615 is different. When system class loader 619 initializes itself, it retrieves encrypted rename table 615 and key 613 from byte code package 611. In this version, key 613 is the key 609 that was used to encrypt encrypted rename table 615. Then, instead of decrypting rename table 615, system class loader 619 uses key 609 to encrypt the system symbolic names used in the Java virtual machine. It relates the encrypted system symbolic names to their definitions, and uses these encrypted symbolic names and linkings 631 together with encrypted rename table 615 to link obfuscated system symbolic names 621 to their system class definitions. When class loader 627 receives an obfuscated symbolic name 621, it looks up the obfuscated symbolic name in encrypted rename table 615 and then applies the encrypted symbolic name corresponding to the obfuscated symbolic name to encrypted symbolic name and linking information 631 to obtain the linking information 623 corresponding to the obfuscated symbolic name. There are two advantages of version 625 over version 617: first, the key in version 625 cannot be used to decrypt encrypted rename table in byte code package 611. Second, class loader 627 never contains a decrypted version of encrypted rename table 615.

Keys 613 may be handled in any of the ways generally used to protect keys and encrypted contents. If key 613 is included in byte code package 611 and is a decryption key 614, it must itself be protected, for example, by encrypting it in such a way that only someone who has legitimately received a copy of byte code package 611 can decrypt it. If package 611 is mobile code for a hardware device such as a cellular telephone or a cable TV set-top box, the key can be built into the hardware device and need not be provided in the package at all. If package 611 is downloaded as part of a transaction on the Internet, the key can be provided from a key server after the transaction has been approved. Different keys can of course be used for individual users and/or individual copies of the software.

In the foregoing, obfuscation using encryption has been employed to obfuscate symbolic names defined by the Java infrastructure. These Java system symbolic names are only one example of "well-known" symbolic names, and obfuscation using encryption can be used with any such symbolic names. Other examples of such "well-known" symbolic names are those defined in application libraries such as the ones used to implement APIs (application programmer interfaces). Indeed, since obfuscation by encryption requires only an encrypter or decrypter and a table which relates encrypted program elements to their unencrypted counterparts, the techniques just described are not limited to any particular kind of executable code or any particular elements of that executable code, but can be used to obfuscate any component of any piece of executable code.

The technique of encrypting the construct in the definition and then matching the encrypted construct with an encrypted construct in the executable code can even be used to execute encrypted executable code without decrypting the encrypted executable code. In this case, every component of the executable code, including operation codes (which are, after all, only special kinds of names) is encrypted. Definitions, whether internal to the code or external to the code, are related to encrypted components as described above. When this technique is used with completely encrypted executable code, the encryption may make obfuscation unnecessary.

CONCLUSION

The foregoing Detailed Description has disclosed three new obfuscation techniques to those skilled in the art of obfuscating programs: obfuscation of data field names, obfuscation using a programming language's reflection mechanisms, and obfuscation of externally-defined names using encryption. With each of these techniques, the inventors have disclosed the best modes presently known to them of carrying out the techniques. While the Detailed Description describes how the techniques are employed in byte codes that are produced and executed using the infrastructure provided for programs written in the Java programming language, the techniques are not restricted to the Java programming language, the byte codes produced from Java programs, or the Java infrastructure. For example, the first technique can be used with any executable code that includes references that use symbolic data field names; the second can be used with any executable code that has a reflection mechanism; the third can be used with any executable code that includes constructs that are defined externally to the executable code. With all of these techniques, the detailed manner in which the technique is applied to the executable code will of course depend on the kind of executable code the technique is applied to and the kind of infrastructure used to produce and execute the executable code.

The above being the case, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of obfuscating executable code that uses a first reference including a symbolic object name and a symbolic field name to reference a field containing data, the method comprising the steps of:

defining an object wherein the field is not referenced by a symbolic field name; and replacing the first reference with a second reference that references the field by the defined object's name and the field as required by the defined object.

2. A method of obfuscating executable code in a language that includes classes and methods that permit reflection, the method comprising the steps of:

using the classes and methods that permit reflection to produce one or more first constructs that have the same effect as a second construct in the executable code that does not employ reflection; and replacing the second construct with the one or more first constructs.

3. A method of executing obfuscated code that includes a portion that relates a first construct whose definition is local to the executable code to a second construct whose definition is external to the executable code and that has been obfuscated by encrypting at least the second construct, the method comprising the steps of:

receiving code that includes the portion; and when the executable code is executed, employing a key and cryptographic apparatus to relate the second construct to the external definition therefor.

4. The method of executing obfuscated code set forth in claim 3 wherein the step of employing the cryptographic apparatus includes the steps of:

using a decryption key with the cryptographic apparatus to decrypt the encrypted second construct; and using the decrypted second construct to relate the first construct to the external definition.

5. The method of executing obfuscated code set forth in claim 3 wherein the step of employing the cryptographic apparatus includes the steps of:

using an encryption key with the cryptographic apparatus to encrypt at least the second construct in the external definition; and using the encrypted second construct from the external definition to relate the encrypted second construct from the executable code to the external definition, whereby the first construct is related to the external definition.

6. The method of executing obfuscated code set forth in any one of claims 3, 4, or 5 wherein:

the executable code includes a plurality of the first and second constructs contained in a plurality of the portions; and a plurality of keys and the cryptographic apparatus are employed to relate the second constructs to the external definitions therefor.

7. The method of executing obfuscated code set forth in any one of claims 3, 4, or 5 wherein:

the second constructs are class specifiers; and the step of employing a key and cryptographic apparatus is performed in a loader for the class specifiers.

8. The method of executing obfuscated code set forth in any one of claims 3, 4, or 5 wherein:

in the step of receiving, the code is downloaded; and the step of employing a key and cryptographic apparatus is performed after downloading.

9. A method of obfuscating executable code that includes a portion that relates a first construct whose definition is local to the executable code to a second construct whose definition is external to the executable code, the method comprising the steps of:

locating the portion; and encrypting at least the second construct.

10. The method of obfuscating executable code set forth in claim 9 wherein there are a plurality of first and second constructs contained in a plurality of the portions; and in the step of encrypting at least the second construct, a plurality of keys is employed to encrypt the second constructs in the plurality of portions.

11. A method of executing a construct that is encrypted in executable code without decrypting the encrypted construct, the construct being one of a plurality of constructs belonging to an execution environment in which the executable code will execute and the method comprising the steps of:

using an encryption key that was used to encrypt the construct in the executable code to encrypt the constructs in the execution environment;

comparing the encrypted construct in the executable code with the encrypted constructs in the execution environment; and when a match is found, executing the encrypted construct in the executable code using the unencrypted construct in the execution environment that corresponds to the matching encrypted construct in the execution environment.

12. The method of executing a construct set forth in claim 11 wherein:

the executable code is mobile code; and the steps of the method are performed in an apparatus to which the mobile code has been downloaded.

13. A data storage device for use with a computer, the data storage device being characterized in that:

the data storage device contains code which, when executed by the computer, causes the computer to perform the method set forth in any one of claims 1, 2, 3, 9, or 11.

* * * * *